US005736051A

United States Patent [19]

Degen et al.

[11] Patent Number: 5,736,051
[45] Date of Patent: Apr. 7, 1998

[54] POLYVINYLIDENE FLUORIDE MEMBRANE AND METHOD FOR REMOVING VIRUSES FROM SOLUTIONS

[75] Inventors: Peter John Degen, Huntington; Ioannis P. Sipsas, Forest Hills; Gregory C. Rapisarda, West Islip; Joseph Gregg, Glen Head, all of N.Y.

[73] Assignee: Pall Corporation, East Hills, N.Y.

[21] Appl. No.: 327,622

[22] Filed: Oct. 24, 1994

Related U.S. Application Data

[63] Continuation-in-part of Ser. No. 173,755, Dec. 22, 1993, abandoned.

[51] Int. Cl.$^6$ .......................... B01D 69/02; B01D 71/32; C12N 7/00; C12Q 1/70
[52] U.S. Cl. .................. 210/650; 210/321.86; 210/490; 210/500.22; 210/500.42; 210/651; 264/41; 427/245; 435/5; 435/235.1
[58] Field of Search ........................ 210/650, 651, 210/652, 653, 500.42, 500.36, 500.35, 490, 500.22, 506, 321.86, 321.87; 264/41, 49, 22; 435/5, 235.1; 427/244, 245, 246

[56] References Cited

U.S. PATENT DOCUMENTS

| | | |
|---|---|---|
| 3,549,016 | 12/1970 | Rigopulos . |
| 3,919,044 | 11/1975 | Melnick et al. . |
| 3,988,245 | 10/1976 | Wang . |
| 4,083,904 | 4/1978 | Sano et al. . |
| 4,207,182 | 6/1980 | Marze . |
| 4,214,020 | 7/1980 | Ward et al. . |
| 4,214,994 | 7/1980 | Kitano et al. . |
| 4,276,177 | 6/1981 | Smith . |
| 4,288,475 | 9/1981 | Meeker . |
| 4,326,958 | 4/1982 | Kawahara et al. . |
| 4,340,479 | 7/1982 | Pall . |
| 4,340,480 | 7/1982 | Pall et al. . |
| 4,399,035 | 8/1983 | Nohmi et al. . |

(List continued on next page.)

FOREIGN PATENT DOCUMENTS

| | | |
|---|---|---|
| 0 420 765 | 3/1991 | European Pat. Off. . |
| 430 082 | 6/1991 | European Pat. Off. . |
| 0 517 501 | 12/1992 | European Pat. Off. . |
| WO 92/19355 | 11/1992 | WIPO . |
| WO 93/22034 | 11/1993 | WIPO . |

OTHER PUBLICATIONS

Phillips et al., "Corrtest™: A Novel Integrity Test for Correlating Virus Retention," *Validation of Pharmaceuticals and Biopharmaceuticals*, Parenteral Drug Association, Inc., Second International PDA–Congress and Workshops, Basel, Switzerland, 183–188 (Feb. 22–24, 1993).

DiLeo et al., "High Resolution Removal Of Virus From Protein Solutions Using A Membrane Of Unique Structure", *Bio/Technology*, 10(2), 182–188 (1992).

*Primary Examiner*—Joseph W. Drodge
*Attorney, Agent, or Firm*—Leydig, Voit & Mayer, Ltd.

[57] ABSTRACT

The present invention provides an isotropic, skinless, porous, polyvinylidene fluoride membrane having a $K_{UF}$ of at least about 15 psi (103 kPa), and preferably below about 50 psi (345 kPa), when tested using liquid pairs having an interfacial tension of about 4 dynes/cm (4 mN/m). The present inventive membrane preferably has a titer reduction of at least about $10^8$ against $T_1$ bacteriophage, more preferably also against PR772 coliphage, and even more preferably also against PP7 bacteriophage. The present inventive membrane can have a thickness of about 20 mil (500 µm) or less and even as low as about 5 mil (125 µm) or less. The present invention also provides a method of preparing such a membrane by providing a casting solution comprising polyvinylidene fluoride and a solvent therefor, heating the casting solution to a uniform temperature of about 57° C. to about 60° C., spreading the casting solution onto a substrate to form a film, quenching the film in a quench bath so as to form a porous membrane, and washing and drying the porous membrane.

82 Claims, 4 Drawing Sheets

U.S. PATENT DOCUMENTS

| | | |
|---|---|---|
| 4,440,896 | 4/1984 | Schuppiser et al. . |
| 4,473,474 | 9/1984 | Ostreicher et al. . |
| 4,518,466 | 5/1985 | Takashi et al. . |
| 4,623,463 | 11/1986 | Ford et al. . |
| 4,645,602 | 2/1987 | Barnes, Jr. et al. . |
| 4,673,504 | 6/1987 | Ostreicher et al. . |
| 4,707,265 | 11/1987 | Barnes, Jr. et al. . |
| 4,708,803 | 11/1987 | Ostreicher et al. . |
| 4,753,988 | 6/1988 | Henton et al. . |
| 4,767,643 | 8/1988 | Westervelt et al. . |
| 4,770,777 | 9/1988 | Steadly et al. . |
| 4,774,001 | 9/1988 | Degen et al. . |
| 4,774,132 | 9/1988 | Joffee et al. . |
| 4,775,703 | 10/1988 | Susa . |
| 4,776,936 | 10/1988 | Smith et al. ............ 204/157.15 |
| 4,776,959 | 10/1988 | Kasai et al. . |
| 4,788,055 | 11/1988 | Fischer et al. . |
| 4,788,226 | 11/1988 | Curry . |
| 4,795,559 | 1/1989 | Shinjou et al. . |
| 4,801,766 | 1/1989 | Aida et al. . |
| 4,806,291 | 2/1989 | Susa . |
| 4,808,315 | 2/1989 | Manabe et al. . |
| 4,810,384 | 3/1989 | Fabre . |
| 4,824,443 | 4/1989 | Matson et al. . |
| 4,824,568 | 4/1989 | Allegrezza, Jr. et al. . |
| 4,855,163 | 8/1989 | Joffee et al. . |
| 4,857,196 | 8/1989 | Manabe et al. . |
| 4,861,628 | 8/1989 | Schucker . |
| 4,880,548 | 11/1989 | Pall et al. . |
| 4,886,836 | 12/1989 | Gsell et al. . |
| 4,894,157 | 1/1990 | Johnson . |
| 4,904,385 | 2/1990 | Wessling et al. . |
| 4,904,394 | 2/1990 | Clarke et al. . |
| 4,906,374 | 3/1990 | Gsell . |
| 4,921,654 | 5/1990 | Hou et al. . |
| 4,925,572 | 5/1990 | Pall . |
| 4,929,354 | 5/1990 | Meyering et al. ............ 210/321.86 |
| 4,933,083 | 6/1990 | Jones, Jr. . |
| 4,954,256 | 9/1990 | Degen et al. . |
| 4,954,388 | 9/1990 | Mallouk et al. . |
| 4,963,261 | 10/1990 | Witkowski et al. . |
| 4,978,451 | 12/1990 | Taylor . |
| 5,017,292 | 5/1991 | DiLeo et al. . |
| 5,019,260 | 5/1991 | Gsell et al. . |
| 5,022,990 | 6/1991 | Doi et al. . |
| 5,023,053 | 6/1991 | Finlan . |
| 5,066,401 | 11/1991 | Müller et al. . |
| 5,076,933 | 12/1991 | Glenn et al. . |
| 5,091,086 | 2/1992 | Stengaard . |
| 5,096,637 | 3/1992 | DiLeo et al. . |
| 5,143,616 | 9/1992 | Pall et al. . |
| 5,145,583 | 9/1992 | Angleraud et al. . |
| 5,151,193 | 9/1992 | Grobe et al. . |
| 5,185,082 | 2/1993 | Nakano et al. . |
| 5,196,508 | 3/1993 | Sipsas et al. . |
| 5,198,505 | 3/1993 | Sipsas et al. . |
| 5,209,849 | 5/1993 | Hu et al. ............ 210/490 |
| 5,282,971 | 2/1994 | Degen et al. ............ 210/500.42 |
| 5,433,859 | 7/1995 | Degen ............ 210/490 |
| 5,480,554 | 1/1996 | Degen et al. ............ 210/651 |
| 5,500,167 | 3/1996 | Degen ............ 210/500.42 |
| 5,531,900 | 7/1996 | Raghavan et al. ............ 210/500.42 |
| 5,645,984 | 7/1997 | Nader ............ 210/651 |

POLYVINYLIDENE FLUORIDE MEMBRANE AND METHOD FOR REMOVING VIRUSES FROM SOLUTIONS

CROSS-REFERENCE TO RELATED APPLICATION

This application is a continuation-in-part of U.S. patent application Ser. No. 08/173,755, filed Dec. 22, 1993, now abandoned.

TECHNICAL FIELD OF THE INVENTION

The present invention relates to a porous membrane comprising polyvinylidene fluoride, as well as to methods of preparing and using such a membrane. The present inventive membrane has been found to be particularly useful in the filtration of pharmacological and other solutions, particularly in the removal of viruses from such solutions.

BACKGROUND OF THE INVENTION

In preparing solutions which are intended for administration to animal or human hosts, such as pharmacological and life-support solutions, it is important that such solutions be as free as possible from substances which may cause adverse reactions in the host. One such contaminant which is of particular concern are viruses. Viruses are the cause of many of the world's dreaded diseases, such as, for example, polio, hepatitis, and AIDS.

Several different physical and nonphysical processes are presently used to either remove or inactivate viruses. Nonphysical processes used to inactivate viruses include, for example, heat pasteurization and chemical treatment. However, these processes do not affect all viruses equally. Moreover, if biotherapeutic agents are present, such agents can also become inactivated. Further, the chemicals used in chemical treatments can have a deleterious effect upon a host.

An alternative approach involves physical separation processing. Such processes use filtration membranes, e.g., symmetric or asymmetric microporous or ultrafiltration membranes, to remove viruses from a solution. Such membranes remove viruses by either adsorption, sieving, or a combination of adsorption and sieving. Sieving is generally preferred over adsorption because of the greater control that can be exercised over the sieving process and because sieving is less likely to allow a virus to accidentally pass through the filtration membrane.

When filtering viruses, one must take into account the size of the targeted viruses in order to select the appropriate filtration medium. While not all viruses are of the same size, viruses are typically characterized as either "large" viruses or "small" viruses. The large viruses include viruses of about 0.08 µm in effective diameter and larger, e.g., adenoviruses, rheoviruses, and herpes viruses. The small viruses include viruses which are about 0.025–0.028 µm in effective diameter, e.g., hepatitis viruses, polio viruses, and parvoviruses.

The efficient sieving of viruses is limited at present by available filtration membranes. While both microporous and ultrafiltration membranes have been proposed to sieve viruses, each of these membranes are inadequate in various respects.

Microporous membranes are characterized by being isotropic and skinless. In other words, they have a consistent pore structure, and their ability to remove particles, as measured by, for example, titer reduction, is dependent on the pore size and thickness of the membrane. The smallest average pore size currently available in this type of membrane, however, is only about 0.04 µm, e.g., Ultipor N66-NDP (Pall Corporation, Glen Cove, N.Y.). While such membranes are able to remove the relatively large viruses using membranes of reasonable thickness, they cannot generally remove those which fall into the smaller size category. Attempts to prepare a microporous membrane having smaller pores have been unsuccessful to date.

Ultrafiltration membranes are characterized by being asymmetric, i.e., they possess a nonuniform pore size across their thickness. Specifically, such membranes typically consist of an integral bilayer, wherein one layer is a thin skin which exhibits what has been termed slit-like fissures, while the other layer is a thick substructure containing a high concentration of finger-like intrusions or macrovoids. The thin skin has a relatively small pore size, while the thick substructure has a relatively larger pore size. It is the skin, which is integral with the balance of the membrane, that provides the membrane with its filtration rating. Ultrafiltration membranes are generally available in a pore diameter range of from 0.001 to 0.02 µm.

Ideally, the integral skin completely covers the macrovoids of the thick substrate. In practice, however, the skin above the macrovoids almost always contains significant defects, such as cracks, pinholes, and other defects and imperfections, which either breach the skin layer or lead to failure upon use. Thus, there cannot be certainty regarding the integrity of the membrane and its removal rating.

Thus, although ultrafiltration membranes are used in practice, the membranes are used on a statistical basis in view of the integrity defects. That is, since only a small portion of the liquid being filtered will pass through any defects, and as only a portion of all the liquid being filtered contains the undesirable material sought to be removed, the probability is that only a small amount of such material will pass through the membrane. While this may be acceptable for certain applications, it is unacceptable for many other applications, particularly in those situations in which the filtered liquid is intended to be administered to a human or animal, and any viruses or the like which have passed through the membrane can create a serious health problem for the recipient.

Moreover, the manufacture of acceptable ultrafiltration membranes is difficult in view of their structure and the defects which invariably accompany that structure. To date, no ultrafiltration membrane has been manufactured which is in fact free from defects. Furthermore, because of the extremely thin skin (on the order of a few microns in thickness) which is responsible for all of the filtration characteristics of a ultrafiltration membrane, it is quite difficult to replicate on a consistent basis ultrafiltration membranes that possess the same level of defects, pore size, and pore size distribution. In addition, the integrity and other properties of such membranes cannot even be readily tested after manufacture and before actual use because typical testing procedures, e.g., "bubble point" and $K_L$ tests, would require such exceedingly high test pressures so as to crush or otherwise damage the membranes.

Thus, a serious need remains for a filtration membrane which is capable of providing for the efficient and predictable removal of small particles, such as viruses, from a fluid. Such a membrane should preferably exhibit minimal adsorption properties in order to prevent fouling and other undesirable filtration effects. Further, the filtration membrane should be readily reproducible and integrity testable prior to actual use. A commercially adaptable method for preparing such a membrane would also be desirable. The present invention provides such a filtration membrane, as well as related methods of preparing and using such a membrane. These and other objects and advantages of the present invention, as well as additional inventive features, will be apparent from the description of the invention provided herein.

BRIEF SUMMARY OF THE INVENTION

The present invention provides an isotropic, skinless, porous, polyvinylidene fluoride membrane having a $K_{UF}$ of at least about 15 psi (103 kPa), and preferably below about 50 psi (345 kPa), when tested using liquid pairs having an interfacial tension of about 4 dynes/cm (4 mN/m). The present inventive membrane preferably has a titer reduction of at least about $10^8$ against $T_1$ bacteriophage, more preferably also against PR772 coliphage, and even more preferably also against PP7 bacteriophage. The present inventive membrane can have a thickness of about 20 mil (500 µm) or less and even as low as about 5 mil (125 µm) or less.

The present invention also provides a method of preparing such a membrane by providing a casting solution comprising polyvinylidene fluoride and a solvent therefor, heating the casting solution to a uniform temperature of about 57° C. to about 60° C., spreading the casting solution onto a substrate to form a film, quenching the film in a quench bath so as to form a porous membrane, and washing and drying the porous membrane.

DESCRIPTION OF THE PREFERRED EMBODIMENTS

The present invention provides a novel isotropic, skinless, porous membrane having a pore rating which is lower than has been previously accomplished with such membranes. The pore size characteristics of the present inventive membrane can be characterized in terms of $K_{UF}$ as well as titer reduction.

Specifically, the present invention provides an isotropic, skinless, porous polyvinylidene fluoride membrane having a $K_{UF}$ of at least about 15 psi (103 kPa), preferably at least about 17 psi (117 kPa), and most preferably at least about 20 psi (138 kPa), when tested using liquid pairs having an interfacial tension of about 4 dynes/cm (4 mN/m). The present inventive membrane will typically have a $K_{UF}$ below about 50 psi (345 kPa), e.g., about 15 psi (103 kPa) to about 50 psi (345 kPa), and will more generally have a $K_{UF}$ below about 40 psi (276 kPa), e.g., about 17 psi (117 kPa) to about 40 psi (276 kPa), when tested using liquid pairs having an interfacial tension of about 4 dynes/cm (4 mN/m). Even more generally, the present inventive membrane will have a $K_{UF}$ below about 30 psi (207 kPa), e.g., about 18 psi (124 kPa) to about 30 psi (207 kPa), when tested using liquid pairs having an interfacial tension of about 4 dynes/cm (4 mN/m).

The present inventive membrane can also be characterized by its titer reduction against various phages. The present inventive membrane preferably has a titer reduction of at least about $10^8$ against $T_1$ bacteriophage, more preferably also against the smaller PR772 coliphage, and most preferably against the even smaller PP7 bacteriophage as well. The titer reduction of a particular membrane of the present invention is quite predictable based on the $K_{UF}$ and thickness of the membrane. Moreover, the titer reduction can be tailored to be within rather strict confines, evidencing a narrow pore size distribution. For example, the present inventive membrane can have a titer reduction of at least about $10^8$ against $T_1$ bacteriophage, or even against PR772 coliphage, while having a titer reduction of about $10^2$ or less against PP7.

The present inventive membrane can be prepared so as to be of any suitable thickness and can be layered so as to achieve a desired thickness. Generally, the present inventive membrane will have a thickness of about 20 mil (500 µm) or less, preferably about 10 mil (250 µm) or less, and most preferably about 5 mil (125 µm) or less. For most applications, the present inventive membrane can have a thickness of about 3 mil (75 µm) to about 5 mil (125 µm). The present inventive membrane can be of these various thicknesses and still be characterized by the aforesaid $K_{UF}$ and/or titer reduction values. Thus, while the membrane of the present invention can be prepared so as to be quite thin, e.g., about 1–5 mil (25–125 µm) in thickness or even as thin as 1–3 mil (25–75 µm) in thickness, the present inventive membrane can still provide excellent titer reduction against viruses.

Figure 1A:
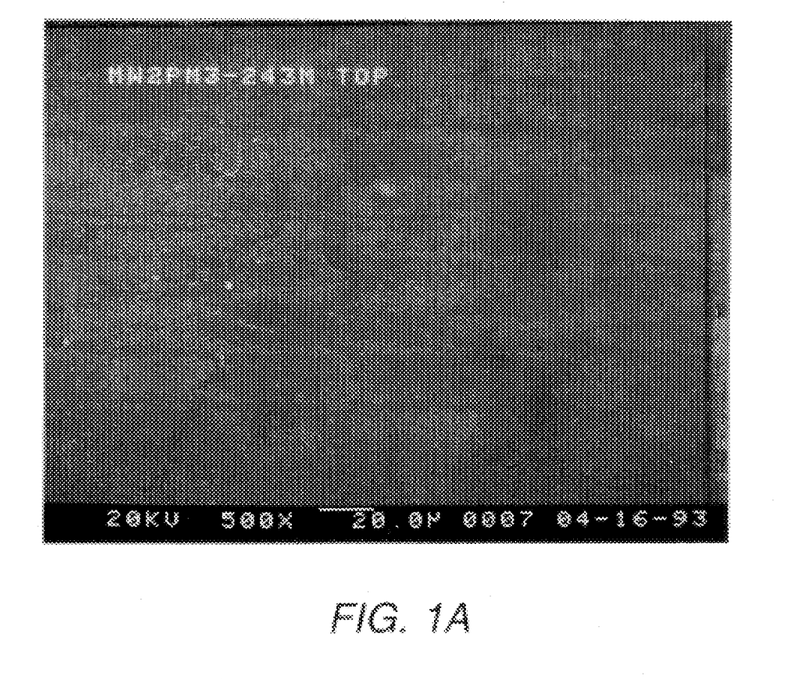
FIGS. 1A and 1B are scanning electron micrographs of a polyvinylidene fluoride membrane of the present invention taken at 500X magnification (FIG. 1A) and 5.0KX magnification (FIG. 1B).
Figure 1B:
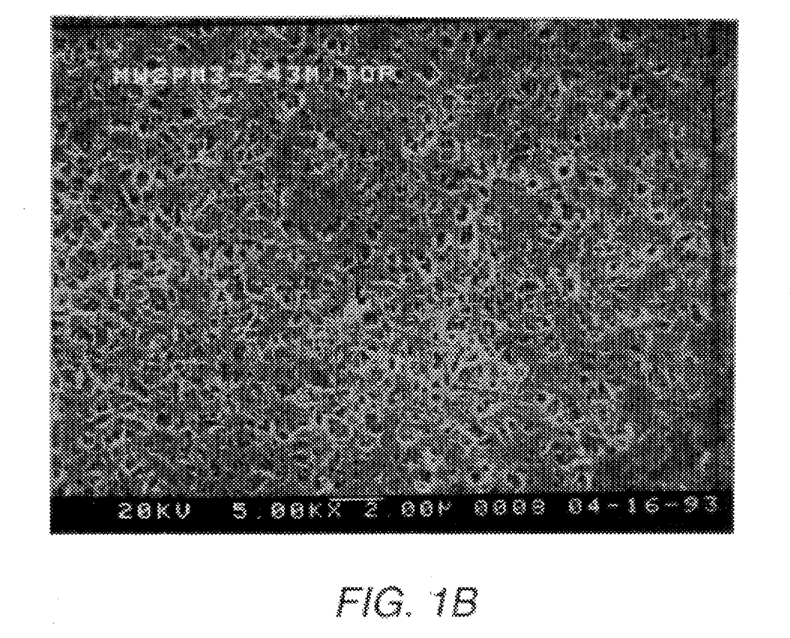
Figure 2A:
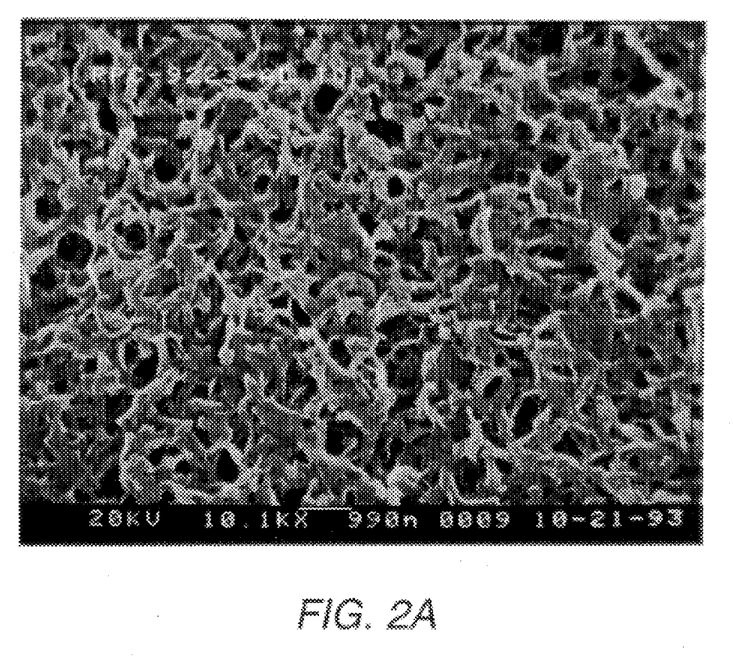
FIGS. 2A and 2B are scanning electron micrographs of the top (FIG. 2A) and bottom (FIG. 2B) of a polyvinylidene fluoride membrane of the present invention taken at 10.1KX magnification.
Figure 2B:
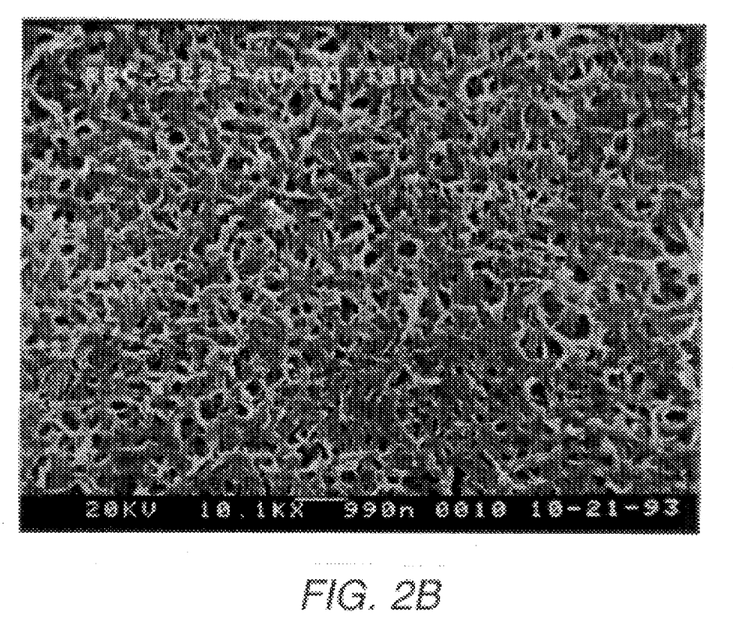
Figure 4:
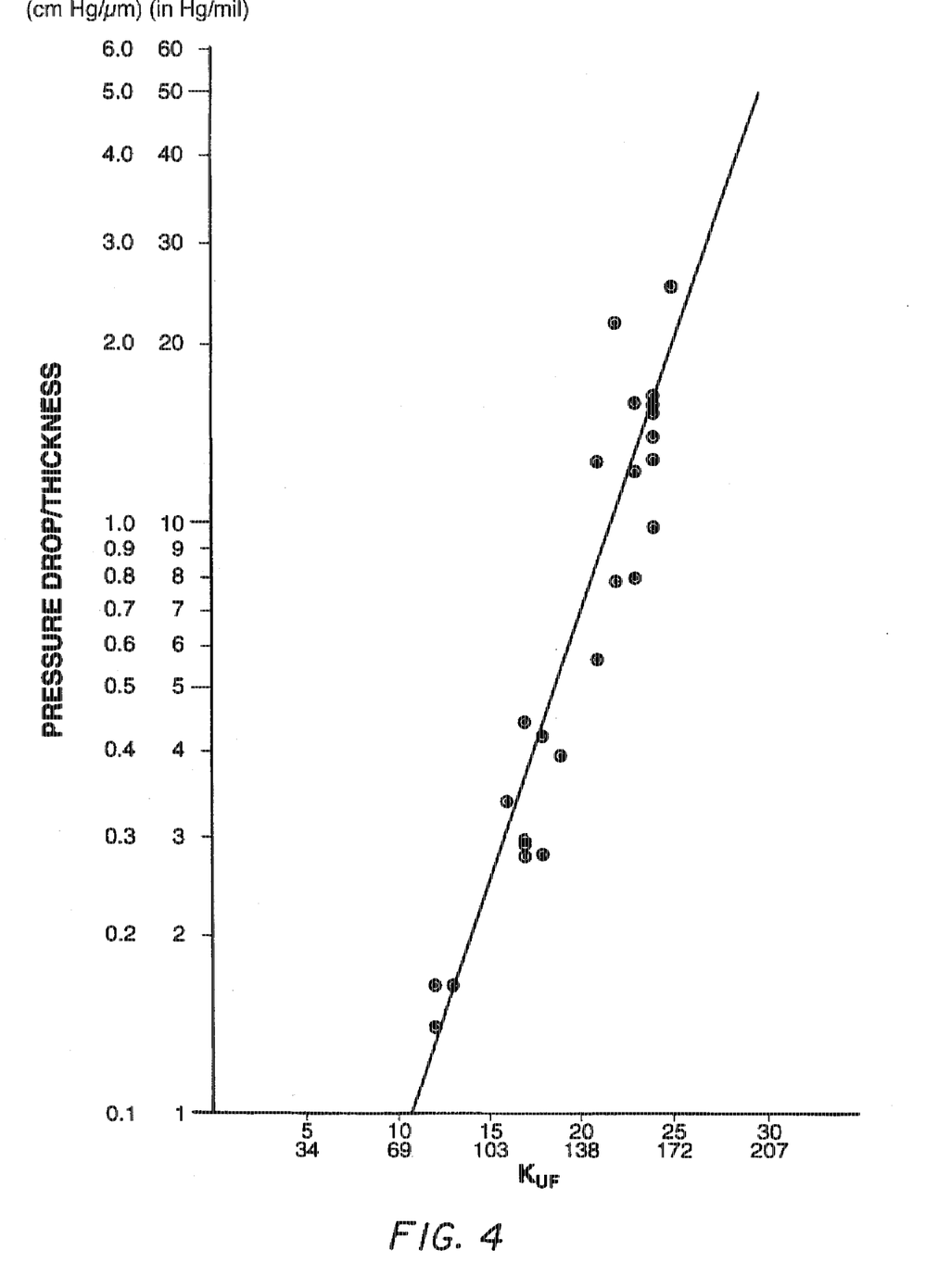
FIG. 4 is a graph depicting a curve showing the relationship between pressure drop across the membrane ($\Delta P$) divided by the thickness of the membrane (in. Hg/mil and cm Hg/µm; logarithmic scale) and membrane $K_{UF}$ (psi and kPa).

Since the present inventive membrane is isotropic, it has a substantially uniform and symmetrical pore structure. Representative membranes of the present invention are shown in the scanning electron micrographs of FIGS. 1A (500X) and 1B (5.00KX), which depict the fine and uniform pore structure of the membrane, and in the scanning electron micrographs of FIGS. 2A and 2B (both 10.1KX), which depict the top and bottom views of the same membrane. In addition, the isotropic nature of the present inventive medium is illustrated by the straight line plot in the graph of FIG. 4. That figure depicts a plot of membrane pressure drop ($\Delta P$) independent of membrane thickness (in. Hg/mil and cm Hg/mil) on a logarithmic scale versus the membrane $K_{UF}$ (psi and kPa). The resulting straight line curve is indicative of an isotropic membrane.

$K_{UF}$ Determination

Test methods known as the "bubble point" (ASTM F316-86) and the $K_L$ (U.S. Pat. No. 4,340,479) test methods have been employed in the past to evaluate the pore size characteristics of microporous membranes. Although these test methods, particularly the $K_L$ test method, can be used to evaluate the present inventive membrane, such tests require high pressures in conjunction with membranes of very small pores, which can cause reliability problems. Thus, the present inventive membrane is preferably characterized by use of the $K_{UF}$ test method which was developed by Pall Corporation to provide a means to more reliably evaluate the pore size and membrane integrity of membranes with very small pore ratings.

The $K_{UF}$ test method is described in U.S. patent application Ser. No. 07/882,473, filed May 13, 1992, now U.S. Pat. No. 5,480,554. In accordance with the $K_{UF}$ test method, the membrane to be tested is first thoroughly wetted with a wetting liquid that is capable of fully wetting the membrane. A displacing liquid, which is immiscible with the wetting liquid used to wet the membrane but has a low, stable interfacial tension, is placed in contact with the upstream side of the wetted membrane. Pressure is then incrementally applied to the displacing liquid, and the flow of the displacing liquid through the membrane is measured as a function of the applied pressure. The displacing liquid should be stable but not miscible with the wetting liquid, and the interfacial tension between the two liquids should be about 10 dynes/cm (10 mN/m) or less. Controlling the interfacial tension to less than 10 dynes/cm (10 mN/m) allows fluid displacement to be achieved at much lower pressures than in similar testing normally performed with a water/air interface (i.e., in the $K_L$ or bubble point test methods). In addition, it is important that the interfacial tension between the two liquids remain constant during the test procedure. A plot of the flow rate of displacing liquid, per unit area of the membrane, through the membrane as a function of applied pressure can be made, and a straight line can be drawn through the steep part of the resulting curve, using regression analysis, which will intersect the horizontal axis at a given pressure value. This point of intersection is deemed the $K_{UF}$ value and is directly related to the pore size of the membrane. Since there is no diffusive flow through a membrane which is free of defects, the flow rate of the displacing liquid through the membrane prior to the $K_{UF}$ value is zero, i.e., a flat line in the typical plot of flow rate versus pressure.

The $K_{UF}$ values recited herein were determined using liquid pairs having an interfacial tension of about 4 dynes/cm (4 mN/m). In particular, the $K_{UF}$ values recited herein were determined using n-pentanol, saturated with water, as the wetting liquid, and water, saturated with n-pentanol, as the displacing liquid. The immiscible phases are mutually saturated to ensure that the interfacial tension between the liquids, which is about 4.4 dynes/cm (4.4 mN/m) at ambient temperature, does not change due to dissolution of one phase into the other. Other factors such as temperature should also remain relatively constant during the test procedure so as to avoid significant changes in the interfacial tension between the immiscible liquids during the test. While other liquid pairs can be used to determine $K_{UF}$, such as, for example, n-butanol and water, n-pentanol and water were used herein because the thus obtained $K_{UF}$ values were in a convenient range for measurement and because the high mutual solubilities of n-pentanol and water ensured that if there were selective adsorption of one of the components by the membrane, then such adsorption would have little or no effect on the obtained $K_{UF}$ value. Other alcohol/water systems include, for example, n-octanol/water and n-hexanol/water, and other nonalcohol-based liquid pairs, could, of course, be similarly utilized in determining $K_{UF}$.

The interfacial tensions for several organic liquids that form a phase boundary with water as reported in the book Interfacial Phenomena, $2^{nd}$ ed., by J. T. Davies and E. K. Rideal (1963), are set forth below, along with the solubilities of the various compounds in water as reported in the Chemical Rubber Handbook (CRC), 1970 ed.

| Compound | Interfacial Surface Tension (dynes/cm or mN/m) | Temp. (°C.) | Solubility (g/100 g $H_2O$) |
|---|---|---|---|
| ethyl ether | 10.7 | 20 | 7.5 |
| n-octanol | 8.5 | 20 | 0.054 |
| n-hexanol | 6.8 | 25 | |
|  |  | 20 | 0.6 |
| aniline | 5.85 | 20 | |
| n-pentanol | 4.4 | 25 | |
|  |  | 22 | 2.7 |
| ethyl acetate | 2.9 | 30 | |
|  |  | 15 | 8.5 |
| isobutanol | 2.1 | 20 | |
|  |  | 15 | 10.0 |
| n-butanol | 1.8 | 25 | |
|  | 1.6 | 20 | |
|  |  | 15 | 9.0 |

Although only organic liquids and water are set forth in the table immediately above, the $K_{UF}$ test method, as previously indicated, can be performed using any pair of immiscible liquids.

In accordance with the $K_{UF}$ test method, the wetting liquid may be a single liquid compound, such as n-octanol, and the displacing liquid also may be a single compound, such as water, which is substantially insoluble in the n-octanol. Alternatively, the wetting liquid may be an equilibrium mixture comprising a first liquid compound, such as n-pentanol, that is saturated with a second liquid compound, such as water. The second liquid compound, saturated with the first, is then used as the displacing liquid. With respect to either embodiment, it is important that the interfacial tension between the two liquids remains relatively constant while performing the test. It is thus recommended that the phases be compositionally stable, i.e., when the phases are in contact no net flux of either fluid occurs across the interface. Thus, there is no substantial variation in the solubility of the displacing liquid in the wetting liquid, which, if present, could affect the results.

In practice the $K_{UF}$ test is usually run with each of the immiscible phases saturated with the fluid in which it is in intimate contact. For example, the solubility of n-pentanol in water is 2.7 g per 100 g of water at 22° C. Since some n-pentanol will dissolve in water it is preferred that the water phase be saturated with n-pentanol. Likewise, with the n-pentanol phase, it is preferred that it be saturated with water. Mutually saturated phases are easily achieved by shaking a mixture containing sufficient quantities of each of the fluids together in a container or separatory funnel. In the tests and examples described herein, the organic phase was in each case used to wet the membrane. It is an obvious extension of the method to reverse the fluids, i.e., wetting the membrane with the aqueous phase and pressurizing the upstream side of the membrane with the organic phase.

The absolute $K_{UF}$ values, of course, will vary depending on the particular alcohol/water system, although the values obtained using other alcohol/water systems can be generally correlated to the n-pentanol/water system $K_{UF}$ values through use of the ratio of their respective interfacial tensions. For example, a $K_{UF}$ value of about 45 psi (310 kPa) in the n-pentanol/water system is equivalent to a $K_{UF}$ value of about 18 psi (124 kPa) in the n-butanol/water system (i.e., 45 psi (or 310 kPa)×1.8/4.4).

Titer Reduction

Titer reduction has reference to the ability of a particular membrane to remove a given particle from a fluid. As such, titer reduction is a standard measure of a membrane's ability to remove biological organisms, such as bacteria and viruses. While any suitable particle may be used in determining titer reduction, the titer reduction of the present inventive membrane was evaluated by challenging the membrane with $T_1$ and PP7 bacteriophages (generally a 50:50 mixture of the two bacteriophages at a level of $10^9$–$10^{10}$ bacteriophages/ml) in a gel phosphate buffer. For purposes of the evaluations reported herein, *E. coli* ATCC #11303 was the source of the $T_1$ phage, and *P. aeruginosa* ATCC #15612 was the source of the PP7 phage. In addition to the $T_1$ and PP7 bacteriophages, the present inventive membrane was also tested against the PR772 coliphage. The source of the PR772 phage for purposes of the evaluations reported herein was Prof. H. W. Ackerman, Department of Microbiology, Faculty of Medicine, Laval University, Quebec, Canada.

The titer reduction of a membrane is defined as the ratio of the phage contained in the influent to that obtained in the effluent. As the size of the $T_1$ phage is about 0.078 μm, the size of the PR772 phage is about 0.053 μm, and the size of the PP7 phage is about 0.027 μm, these phages provide excellent models for assessing the removal efficiency of a membrane with regard to larger, intermediate-sized, and smaller viruses. A membrane is generally considered to have an "absolute" removal ability with respect to a particular particle, e.g., the $T_1$ phage as representative of larger viruses, when it has at least a $10^8$, and preferably at least a $10^{10}$, titer reduction against that particle. Of course, an absolute removal ability of a membrane with respect to the PR772 or PP7 phages would confirm the absolute removal ability of that membrane with respect to larger viruses.

Since these biological organisms are capable of rapid replication, they allow for easy detection of the most minute quantities in the filtrate of a test solution. Thus, the inability to detect any quantity of a particular such model biological organism in the filtrate of a test solution is excellent confirmation of the fact that the particular membrane actually prevented all of the biological organism in the challenge liquid from passing through the membrane. Moreover, since the quantity of viruses found as contaminants in most commercial processes rarely exceeds about $10^4$/ml, the ability of the present inventive membrane to have a titer reduction of $10^8$ or higher can provide nearly absolute assurance of the removal of all viruses from a wide variety of liquids, particularly those involved in commercial processing, e.g., pharmaceutical production.

Titer reduction is a function of the $K_{UF}$ value of a membrane and the thickness of the membrane. Since the pressure drop across a membrane is exponentially affected by the $K_{UF}$ of a membrane, while the pressure drop across a membrane is only linearly affected by the thickness of the membrane, small improvements in the titer reduction of a particular membrane can generally be accomplished in a more economical manner by increasing the thickness of the membrane, e.g., by providing multiple layers of the same membrane.

Pressure Drop

The pressure drop across a membrane is quite important in the use of such membranes for filtration purposes. The present inventive membrane advantageously provides the desired titer reduction against a certain particulate with a satisfactory pressure drop (ΔP) across the membrane. The pressure drops referenced herein were calculated using conventional techniques, such as described in U.S. Pat. No. 4,340,479, and all pressure drop values reported herein (in. Hg (cm Hg) or psi (kPa)) were determined at a constant air flow rate of 2 ft/min (61 cm/min).

Preparation Method

The membranes of the present invention are prepared from polyvinylidene fluoride (PVDF) using the wet casting procedure described in U.S. Pat. No. 4,340,479 in conjunction with the particular temperature constraints discussed herein. Any suitable polyvinylidene fluoride may be used, such as Kynar® 761 and 761 PVDF resins. The polyvinylidene fluoride will typically have a molecular weight of at least about 5,000 daltons, preferably a molecular weight of at least about 10,000 daltons.

Figure 3:
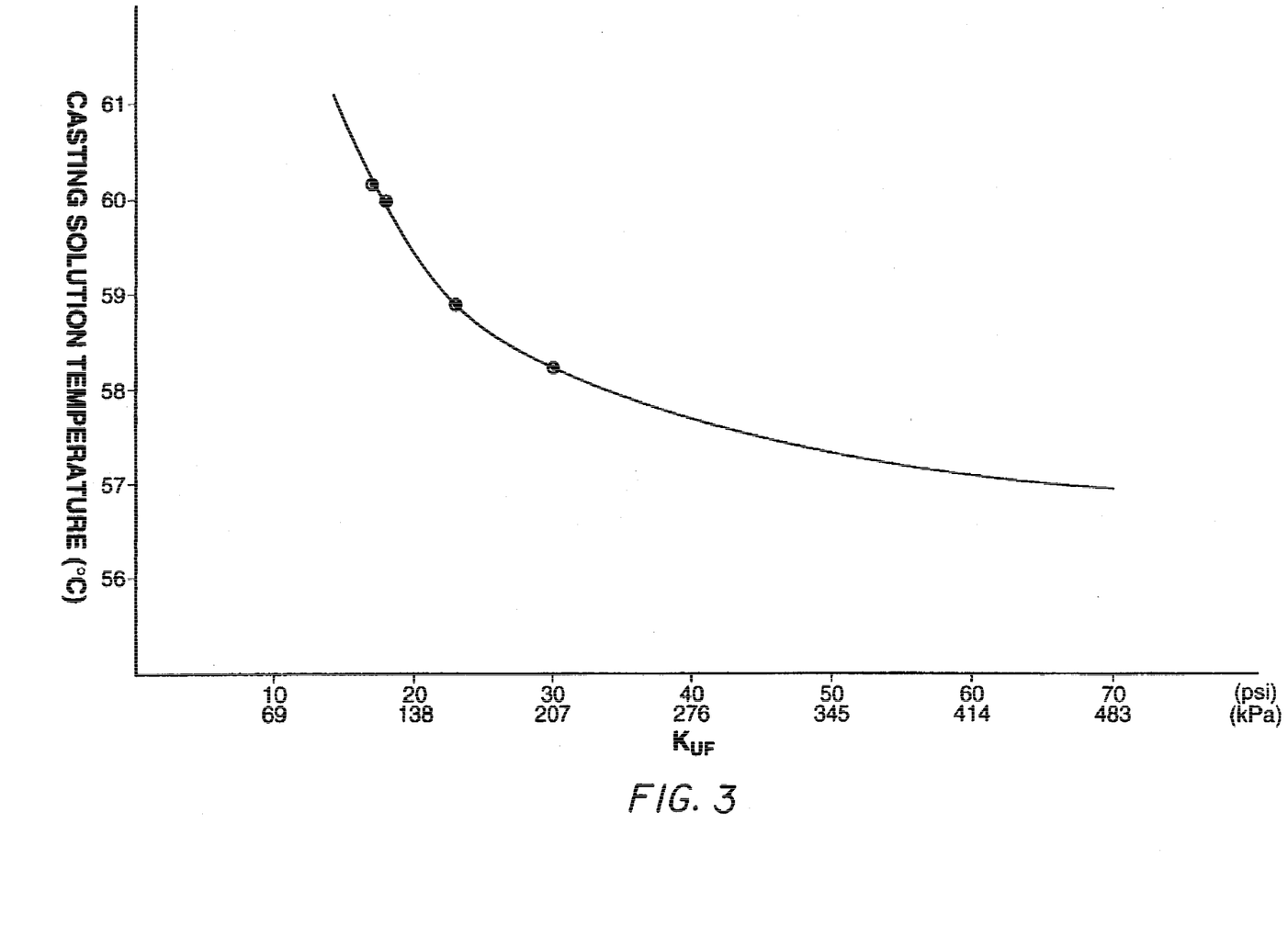
FIG. 3 is a graph depicting a curve showing the relationship between the casting solution temperature (° C.) and the resulting membrane $K_{UF}$ (psi and kPa).

The present inventive method of preparing the membranes described herein comprises providing a casting solution comprising polyvinylidene fluoride and a solvent therefor, heating the casting solution to a uniform temperature of about 57° C. to about 60° C., spreading the casting solution onto a substrate to form a film, quenching the film in a quench bath so as to form a porous membrane, and washing and drying the porous membrane. The temperature of the casting solution is directly related to the $K_{UF}$ of the resulting membrane, as is illustrated in the graph of FIG. 3 which contains a plotted curve of casting solution temperature (° C.) versus resulting membrane $K_{UF}$ (psi and kPa). For example, a casting solution temperature of about 58° C. will result in the formation of a membrane having a $K_{UF}$ of about 31 psi (214 kPa), while a casting solution temperature of about 60° C. will result in the formation of a membrane having a $K_{UF}$ of about 17 psi (117 kPa).

It has been surprisingly discovered that the temperature at which the polyvinylidene fluoride casting solution is maintained is quite critical to the preparation of the present inventive membrane. Great care must be exercised to ensure that the casting solution temperature is uniform, i.e., at a particular temperature ±0.01° C., so as to ensure the substantial uniformity of the pore structure within the membrane. Moreover, while not intending to be bound to any particular theory underlying the present invention, it appears that the casting solution has at least a short-term memory, such that it is difficult to prepare the present inventive membrane of a desired $K_{UF}$ value if the temperature of the casting solution has significantly exceeded about 60° C. at any time during the processing of that casting solution, even if the temperature is subsequently lowered to below about 60° C. One possible explanation for this apparent effect is that, while a single temperature may be reported for the casting solution, the reported temperature is actually an average of a range (or distribution) of temperatures within the casting solution such that a significant portion of the casting solution may actually be well above the reported temperature. This may explain the particular success in preparing suitable membranes through use of the preferred techniques of the present inventive method, which involve approaching the desired temperature of the casting solution with increasingly higher precision heating devices (which not only efficiently provides a uniform temperature for the casting solution but also significantly reduces the possibility that some portion of the casting solution will significantly exceed about 60° C., and more preferably the desired final temperature of the casting solution, at any given step of the heating process).

While the present inventive method can be carried out in a variety of suitable manners, a preferred embodiment of the present inventive method begins with the formation of a solution consisting of polyvinylidene fluoride in powder form, a solvent for the resin, advantageously dimethylacetamide, and a nonsolvent, advantageously isopropanol. The solution comprises about 10 to about 20 wt. %, and advantageously from about 15 to 17 wt. %, polyvinylidene fluoride. The balance of the solution comprises the solvent and nonsolvent in a weight ratio ranging from about 90:10 to about 70:30, preferably about 80:20.

The temperature of the polymer solution is then raised to the desired casting solution temperature. Small quantities of polymer can be efficiently handled at uniform temperatures in a one-step process, e.g., a few hundred grams of polymer in a one liter solution can be uniformly heated in a jacketed kettle with impeller stirring at high rpm. With larger quantities, particularly commercial production quantities, it is not practical to use a one-step heating process such as a jacketed kettle due to the significant temperature variations in the casting solution which must be avoided to satisfactorily prepare the present inventive membrane.

As regards larger quantities, therefore, the temperature of the casting solution is preferably raised in stages so as to carefully control temperature uniformity while minimizing the time required to raise the temperature. At each successive stage, the temperature is raised and brought closer to the casting temperature necessary to prepare a membrane of the desired $K_{UF}$, but in a manner which ensures greater uniformity (i.e., a narrower temperature distribution) so as to ensure that the casting solution does not exceed the desired casting temperature.

In particular, a larger quantity of polyvinylidene fluoride can be placed into a thermostatically controlled tank and dispersed in a suitable mixture of solvent and nonsolvent. During the mixing of the casting solution, the temperature of the tank is maintained at a temperature which allows the contents therein to reach a temperature of about 47° C. to about 51° C., which is well below the desired casting solution temperature. This average temperature is selected so as to ensure that no significant portion of the solution exceeds the desired casting solution temperature between about 57° C. and about 60° C. The components should remain in the tank until the polyvinylidene fluoride has dissolved, and the resulting solution is uniformly heated with that equipment, e.g., for about 16 hours or so.

The casting solution is then preferably transported through a heat exchanger to raise its temperature to about 52° C. and then passed through an in-line mixer (or other suitable high precision heating device) which raises the temperature of the casting solution to the desired uniform casting solution between about 57° C. and about 60° C.±0.01° C. The uniformity of temperature is quite important to the uniformity of the pore structure within the resulting membrane.

After the casting solution is heated in the in-line mixer, and before the casting solution is spread (i.e., cast) onto a substrate, the viscosity of the casting solution will typically be increased by passing the casting solution through a viscosity leveler, e.g., another heat exchanger which lowers the temperature of the casting solution to about 35° C. or so. The casting solution is then spread onto a suitable substrate, e.g., mylar, quenched by exposure to a suitable quench bath, e.g., an aqueous solution of dimethylacetamide and isopropanol, and washed, e.g., with deionized water, by conventional techniques so as to form the present inventive membrane.

After washing is completed, the wet membrane is collected and dried. While drying may be undertaken by any suitable means, e.g., by heat in an oven, it has been discovered that drying by the direct application of heat, as in an oven, results in an undesirable increase in pore size of the resulting membrane. This has been overcome, however, by the application of microwave energy to the membrane in order to effect the drying of the membrane. Microwaves having a frequency of about 24 MHz are preferably used, although any frequency can be used so long as the pore size or $K_{UF}$ value of the membrane is not unduly effected.

Heat-Treatment

The resulting polyvinylidene fluoride membrane can be heat-treated or annealed, if desired, to improve its properties. In particular, the present inventive membrane can be heated under conditions to improve the strength and subsequent hydrophilization of the membrane.

Preferably, the present inventive membrane is heated to a temperature of at least about 80° C. for a time sufficient to achieve a state such that, when subsequently hydrophilized, the resultant hydrophilized membrane has substantially uniform hydrophilic properties. Of course, the present inventive membrane should not be heated at so high a temperature that the membrane becomes soft and deforms, either under its own weight or due to tension from any mechanical means by which the membrane is supported during the heating process. Typically, the upper temperature limit will be about 160° C. The amount of time of heating will vary with the heating temperature and nature of the membrane being heated. For example, small pieces of membrane in flat sheet form which are in direct contact with a high temperature surface may require only a brief exposure, e.g., less than one minute, to heat, while a rolled membrane of several hundred linear feet may require many hours of heating at low temperature for the membrane to reach a suitable equilibrium temperature. Most preferably, the present inventive membrane is heated to a temperature of about 120° C. for about 24–72 hours, especially for about 48 hours.

The heat-treatment of the present inventive membrane can be effected without the membrane being restrained; however, the membrane preferably is dimensionally restrained during the heat-treatment so as to minimize or avoid dimensional changes in the membrane, e.g., shrinkage. Any suitable means can be used to dimensionally restrain the membrane. For example, the membrane can be placed into a frame or can be wound onto a core or roll, preferably with an interleaved material, such as a fibrous nonwoven material, to prevent layer-to-layer contact of the membrane. Most preferably, the present inventive membrane is heat-treated in roll form interleaved with a polyester fibrous nonwoven material.

The heat-treatment of polyvinylidene fluoride membranes is more fully described in U.S. Pat. Nos. 5,196,508 and 5,198,505. Those patents also describe the improvements in surface modifications which can be obtained by heat-treating polyvinylidene fluoride membranes.

Surface Modification

The resulting polyvinylidene fluoride membrane is hydrophobic and exhibits a significant tendency to adsorb proteins and the like, which may be present in the liquid being filtered. These characteristics are undesirable inasmuch as they contribute to a higher pressure drop across the membrane and can ultimately result in the premature fouling of the membrane and/or, in certain cases, the formation of a secondary sieving layer on the surface of the membrane. As a result, the present inventive membrane is preferably surface modified to render it hydrophilic (i.e., having a critical wetting surface tension (CWST) of at least about 72 dynes/cm (72 mN/m) as determined by the CWST test disclosed in U.S. Pat. No. 4,880,548) and less susceptible to protein adsorption and fouling.

Such surface modification of the present inventive membrane can be carried out in any suitable manner and is preferably accomplished by graft polymerizing a suitable monomer onto the surface of the membrane. Preferred examples of such monomers include acrylic or methacrylic monomers having alcohol functional groups, such as, for example, hydroxyethylacrylate, hydroxyethylmethacrylate, hydroxypropylacrylate, hydroxypropylmethacrylate, and combinations thereof, particularly hydroxypropylacrylate and/or hydroxyethylmethacrylate. These monomers can be combined with small amounts of acrylic monomers having no alcohol functional groups, such as methyl methacrylate, as described in U.S. Pat. No. 5,019,260.

Any suitable means may be used to polymerize the suitable monomers onto the membranes of the present invention. Radiation grafting is the preferred technique to achieve such a result. The source of radiation can be from radioactive isotopes like Cobalt 60, Strontium 90, and Cesium 137, or from machines like x-ray machines, electron accelerators, and ultraviolet equipment. Preferably, however, the radiation is in the form of electron beam radiation. It has been found that, by using this form of radiation, a very uniform distribution of radiation can be provided. This in turn results in a final product which is grafted more uniformly as compared to those membranes which are grafted using other radiation sources, e.g., Cobalt 60.

Grafting will typically be achieved by either irradiating the membrane and then exposing it to a suitable solution of the monomer or irradiating the membrane while it is exposed to a suitable solution of the monomer. Regardless of which procedure is used, the grafting should be conducted in the absence of oxygen, e.g., under a nitrogen atmosphere, since oxygen will react with the reactive sites created by radiation exposure, thereby lowering the number of sites available for the desired polymer bonding. If the membrane is irradiated prior to immersion in the monomer solution, the membrane should contact the monomer solution as quickly as possible to avoid undesirable reactions resulting in the loss of reactive sites for bonding the polymer to the surface of the membrane. The monomer solution can comprise any suitable concentration of the monomer to be graft polymerized, typically 1–10 vol. % monomer in a solvent system, generally water by itself or with a suitable alcohol such as t-butyl alcohol. The preferred monomer solution in the context of the present invention is 4 vol. % hydroxypropylacrylate, 25 vol. % t-butyl alcohol, and 71 vol. % deionized water. The details and parameters of the polymer grafting of membranes is well known in the art.

While the graft polymerization can be carried out in the absence of crosslinking agents, it is preferred that such crosslinking agents be used, particularly when the aforementioned acrylate monomers are graft polymerized onto the surface of the membrane. Any suitable crosslinking agent can be used in the context of the present invention. Suitable crosslinking agents include di- or poly-acrylates and methacrylates of diols and polyols, particularly linear or branched aliphatic diols such as ethylene glycol, 1,2-propylene glycol, diethylene glycol, dipropylene glycol, dipentylene glycol, polyethylene glycol, polypropylene glycol, polytetramethylene-oxide glycol, and poly(ethylene oxide-copropylene-oxide)glycol, as well as triol acrylates such as trimethylolpropane triacrylate. Examples of other crosslinking monomers that may be used in the instant invention include allyls, maleimides, unsaturated dicarboxylic acids, aromatic vinyl compounds, polybutadienes, and trimellitic acid esters. Other suitable crosslinking agents are described in U.S. Pat. Nos. 4,440,896, 4,753,988, 4,788,055, and 4,801,766.

Polyethylene glycol dimethacrylates wherein the molecular weight of the polyethylene glycol is about 200 to about 600, are preferred crosslinking agents in the context of the present invention. Polyethylene glycol 600 dimethacrylate, especially in conjunction with radiation grafting hydroxypropylacrylate onto the surface of the membrane, is the most preferred crosslinking agent.

The crosslinking agent can be utilized in any suitable amount. Typically, the crosslinking agent will be added to the grafting solution in an amount of about 0.025 vol. % to about 5 vol. %, more typically in an amount of about 0.05 vol. % to about 2 vol. %. Thus, for example, a monomer solution containing 4 vol. % hydroxypropylacrylate in water and t-butyl alcohol preferably contains about 0.5 vol. % polyethylene glycol 600 dimethacrylate as the crosslinking agent.

Illustrative Uses

The present inventive membrane can be used in any suitable application, including many applications in which ultrafiltration membranes are currently being used. In view of the excellent titer reduction of the membrane against viruses and similar sized particulates, the present inventive membrane has particular utility in the filtration of pharmacological liquids and the like, although the present inventive membrane can be used to filter any suitable fluid.

Accordingly, the present invention provides a method of filtering a fluid comprising passing a fluid through the present inventive membrane, particularly an isotropic, skinless, porous, polyvinylidene fluoride membrane having a $K_{UF}$ of at least about 15 psi (103 kPa) when tested using liquid pairs having an interfacial tension of about 4 dynes/cm (4 mN/m) and/or having a titer reduction of at least about $10^8$ against $T_1$ bacteriophage. The fluid to be passed through the present inventive membrane can comprise viruses, e.g., in excess of $10^2$/ml or even $10^4$/ml, before being passed through the membrane, which viruses can be removed from the fluid such that the fluid comprises less than $10^2$/ml or even no viruses after being passed through the membrane. Thus, the present inventive membrane can be used to treat fluids to reduce or remove viruses therein and also can be used to recover and concentrate viruses from fluids for viral identification, testing, and the like.

The ability of the present inventive membrane to be integrity tested with relative ease, and to be consistently prepared on a commercial basis, enables the present inventive membrane to provide a predictable removal rating for given substances. Moreover, the excellent removal characteristics of the present inventive membrane are obtained at a reasonable pressure drop across the membrane. Thus, to the extent that the present inventive membrane can be used in applications in which ultrafiltration membranes are currently being utilized, the present inventive membrane will prove much more desirable than, and will outperform, ultrafiltration membranes in those same applications.

The present inventive membrane can be used alone or can be mated with a suitable support structure. Similarly, the present inventive membrane can be used in suitable filters, filtration cartridges, and the like. Of course, in view of the highly uniform nature of the pore structure within the present inventive membrane, as well the low susceptibility to protein adsorption of the grafted embodiment of the membrane, the present inventive membrane can be used in dead-end filtration applications, as well as in tangential or cross-flow filtration applications.

The present inventive membrane in expected to be especially useful in filter elements, such as filter cartridges, which are generally described in U.S. Pat. No. 4,340,479. Preferred filter elements utilizing the present inventive membrane comprise the present inventive membrane in sheet form, wherein the sides of the membrane have been overlapped and sealed to form a tubular configuration having an exterior surface, an interior, and two ends, and end caps sealed to the ends of the tube, wherein at least one of the end caps has a central aperture providing access to the interior of the tube, and all of the seals are fluid-tight. The present inventive membrane is preferably corrugated in such a filter element so as to provide a large membrane surface area for the volume of the filter element. At least one of the sides of the membrane will typically be adhered to a porous support layer, and, in such a situation, the membrane and porous support layer will generally both be corrugated. The filter element can comprise a single membrane of the present invention or, more preferably, comprises multiple such membranes adhered together. When there are multiple membranes in the filter element, the membranes are preferably separated by a porous support layer to which each membrane is adhered. The other aspects of the filter element may be of any suitable construction and prepared from any suitable material. For example, the end caps can be prepared from a suitable polymeric material, such as polyester, particularly, polybutylene glycol terephthalate or polyethylene glycol terephthalate. The filter element can be constructed using techniques which are well-known in the art.

The following examples further illustrate the present invention and, of course, should not be construed as in any way limiting its scope.

EXAMPLE 1

This example illustrates the preparation of several filtration membranes in accordance with the present invention. The various filtration membranes were prepared using different casting solution temperatures to demonstrate the effect of the casting solution temperature on the $K_{UF}$ of the resulting filtration membrane.

A casting solution was prepared from 17.0 wt. % polyvinylidene fluoride resin, 66.4 wt. % dimethyl acetamide (solvent), and 16.6 wt. % isopropanol (non-solvent). The casting solution was stirred in an enclosed vessel to dissolve the polyvinylidene fluoride resin in the 80:20 w/w solvent/nonsolvent mixture, and the temperature of the casting solution was raised to 50.9° C. and held at that temperature.

Four casting solution samples were then passed through an in-line mixer, and each of the casting solution samples was raised to a different temperature. Each of the solutions was then cooled to increase viscosity, cast as a film onto a substrate, and subjected to a quench bath comprising 42 wt. % water, 51 wt. % dimethyl acetamide, and 7 wt. % isopropanol. The quench bath was maintained at 30° C. The cast film generally remained in contact with the quench bath for less than one minute. The resulting membrane was then washed with water to remove solvent, and the membrane was microwave dried under restraint to prevent shrinkage. Membranes were thus prepared with each of the four casting solution samples.

The temperatures of each of the casting solution samples and the $K_{UF}$ values of each of the resulting membranes are set forth below.

| Sample | Temperature (°C. ± 0.01° C.) | $K_{UF}$ (psi) [kPa] |
|---|---|---|
| 1A | 58.22 | 30 [207] |
| 1B | 58.97 | 23 [159] |
| 1C | 59.77 | 18 [124] |
| 1D | 60.17 | 17 [117] |

The resulting data is plotted in the form of casting solution temperature (° C.) versus $K_{UF}$ (psi and kPa) as the graph of FIG. 3. As is apparent from the data, an increase in the casting solution temperature within the range of about 57° C. to about 60° C. results in a corresponding decrease in the $K_{UF}$ of the filtration membrane prepared from the casting solution.

EXAMPLE 2

This example illustrates the preparation of polyvinylidene fluoride membranes of the present invention which have been provided with a graft-polymerized coating so as to render the membrane hydrophilic and less susceptible to protein binding. The properties of such membranes both before and after grafting were evaluated to demonstrate that the grafting process does not adversely affect the pore rating of the membrane and contributes to only a modest increase in pressure drop across the filtration membrane.

Several membranes of differing $K_{UF}$ values were prepared in accordance with the procedure described in Example 1. A portion of each membrane was grafted using an electron-beam grafting procedure. In particular, the membranes were passed under an electron-beam generator (with 175 kV and 3 mAmp settings) at a rate of 20 ft/min so as to achieve a total radiation dose of 2.4 Mrad. The membranes were then passed into a grafting solution of 4 vol. % hydroxypropylacrylate, 25 vol. % t-butyl alcohol, and 71 vol. % deionized water, rolled up under a nitrogen atmosphere (i.e., protected from oxygen), and stored for several hours prior to washing free of ungrafted monomer. The grafted membranes were frame-dried at 100° C. for 10 min.

The $K_{UF}$, thickness, and pressure drop ($\Delta P$) across each membrane, in ungrafted and grafted form, were determined, and the results are set forth below.

| | Ungrafted Membrane | | | Grafted Membrane | | |
|---|---|---|---|---|---|---|
| | Thickness | | | | | |
| Sample | (mil ± 0.2 mil) [μm ± 5 μm] | $K_{UF}$ (psi) [kPa] | $\Delta P$ (in. Hg) [cm Hg] | $K_{UF}$ (psi) [kPa] | $\Delta P$ (in. Hg) [cm Hg] | water wettable |
| 2A | 1.6 [41] | 17 [117] | 5.5 [14.0] | 18 [124] | 5.7 [14.5] | yes |
| 2B | 1.6 [41] | 24 [165] | 10.2 [25.9] | 25 [172] | 13.8 [35.1] | yes |
| 2C | 1.9 [48] | 21 [145] | 16.7 [42.4] | 24 [165] | 28.7 [72.9] | yes |
| 2D | 2.0 [51] | 24 [165] | 16.6 [42.2] | 25 [172] | 28.7 [72.9] | yes |
| 2E | 1.9 [48] | 17 [117] | 8.0 [20.3] | 16 [110] | 6.8 [17.3] | yes |

As is apparent from the resulting data, the grafting of the present inventive membranes renders those membranes desirably hydrophilic, i.e., water wettable, while adversely affecting the $K_{UF}$ and pressure drop characteristics of the membrane in only a modest manner.

EXAMPLE 3

This example illustrates the excellent titer reductions against various viruses which are characteristic of the present inventive membrane.

Various membranes (142 mm discs of about 1.5–2.0 mil (38–50 μm) thickness) were prepared in accordance with the procedure disclosed in Example 1 and were grafted in accordance with the procedure disclosed in Example 2. The grafted membranes were challenged with a 50:50 mixture of $T_1$ and PP7 bacteriophages (at a level of about $10^{10}$ bacteriophages/ml) in a gel phosphate buffer. As previously discussed, the size of the $T_1$ phage is about 0.078 µm, while the size of the PP7 phage is about 0.027 µm. Thus, these bacteriophages are quite representative of larger and smaller viruses, respectively. The titer reductions of each membrane, alone or multiple-layered, was determined as the ratio of the particular phage contained in the influent to that present in the effluent. The $K_{UF}$ of the ungrafted membrane, the number of membrane layers tested, and the titer reduction $(T_R)$ for each phage are set forth below.

| Sample | $K_{UF}$ (psi) | [kPa] | Number of Layers | $T_R$ ($T_1$ phage) | $T_R$ (PP7 phage) |
|---|---|---|---|---|---|
| 3A | 23 | [159] | 3 | >1.3 × 10¹⁰ | >4.4 × 10⁹ |
| 3B | 21 | [145] | 3 | >1.3 × 10¹⁰ | 8.0 × 10⁶ |
| 3C | 24 | [165] | 1 | >9.1 × 10⁹ | 5.0 × 10¹ |
| 3D | 24 | [165] | 2 | >9.1 × 10⁹ | 4.0 × 10² |
| 3E | 24 | [165] | 3 | >1.0 × 10⁹ | 5.0 × 10⁴ |
| 3F | 24 | [165] | 3 | >1.0 × 10¹⁰ | 1.0 × 10⁵ |
| 3G | 23 | [159] | 3 | >1.0 × 10¹⁰ | 9.0 × 10⁵ |
| 3H | 17 | [117] | 3 | >1.0 × 10¹⁰ | 5.7 |

The resulting data demonstrates that the filtration membrane of the present invention can have a very high titer reduction and can be capable of the "absolute" removal of viruses, as is particularly apparent with sample 3A. Moreover, this high titer reduction capability can be accomplished with remarkably thin membranes, as exemplified by sample 3C. In addition, the resulting data demonstrates that the filtration membrane of the present invention has a very uniform pore structure. For example, sample 3H, is capable of removing all of the $T_1$ bacteriophage while allowing essentially all of the PP7 bacteriophage to pass through. Thus, the sample 3H membrane has a pore size between about 0.078 µm and about 0.027 µm, which is quite a narrow pore size distribution.

EXAMPLE 4

This example further illustrates the excellent virus titer reduction which is characteristic of the present inventive membrane.

The grafted filtration membrane of Example 3 which was designated sample 3F was challenged with a mixture of PR772 coliphage (at a level of 5.2×10⁸ phages/ml) and PP7 bacteriophage (at a level of 1.7×10⁹ phages/ml) in a gel phosphate buffer. As previously described, the size of the PR772 phage is about 0.053 µm, while the size of the PP7 phage is about 0.027 µm. Thus, these phages are quite representative of intermediate-sized and smaller viruses, respectively. The titer reductions of each membrane, alone or multiple-layered, was determined as the ratio of the particular phage contained in the influent to that present in the effluent. The $K_{UF}$ of the ungrafted membrane, the number of membrane layers tested, and the titer reduction $(T_R)$ for each phage are set forth below.

| Sample | $K_{UF}$ (psi) | [kPa] | Number of Layers | $T_R$ (PR772 phage) | $T_R$ (PP7 phage) |
|---|---|---|---|---|---|
| 3G | 23 | [159] | 3 | >5.2 × 10⁸ | 2.2 × 10⁶ |

The determined results confirm the excellent titer reduction of the present inventive membrane against intermediate-sized viruses. Moreover, in view of the moderate removal effectiveness of this particular membrane sample against the much smaller PP7 phage, the pore size of this particular membrane sample is shown to be quite small, i.e., below about 0.053 µm, while the pore size distribution of the sample is also shown to be quite narrow, i.e., from somewhat below about 0.027 µm to below about 0.053 µm.

EXAMPLE 5

This example illustrates the approximate lower operating limit in terms of pore size of the present inventive membrane as regards a satisfactory titer reduction against larger viruses.

A membrane of 1.8 mil (46 µm) thickness was prepared in accordance with the procedure described in Example 1 and evaluated as regards $K_{UF}$, pressure drop (ΔP), and titer reduction $(T_R)$ against $T_1$ and PP7 bacteriophages as described in Example 3. The resulting data is set forth below.

| Sample | $K_{UF}$ (psi) [kPa] | ΔP (in. Hg) [cm Hg] | Number of Layers | $T_R$ ($T_1$ phage) | $T_R$ (PP7 phage) |
|---|---|---|---|---|---|
| 5A | 17 [117] | 6.8 [17.3] | 1 | 7 × 10⁶ | <10 |
| 5B | 17 [117] | 6.8 [17.3] | 2 | >9 × 10⁸ | <10 |

The resulting data demonstrate that the present inventive membrane having a $K_{UF}$ value of about 17 psi (117 kPa) and a thickness of at least about 3.6 mil (92 µm) will exhibit a titer reduction of over 10⁸ against larger viruses. The fact that the present inventive membrane of this example had an "absolute" removal ability with respect to the larger $T_1$ phage while having essentially no removal ability with respect to the smaller PP7 phage demonstrates that the present inventive medium not only has a pore size of between about 0.078 µm and about 0.027 µm, but that the pore size distribution is quite narrow, i.e., below about 0.078 µm to above about 0.027 µm.

EXAMPLE 6

This example illustrates the low protein adsorption characteristics of the grafted filtration membrane of the present invention.

An immersion load binding test was performed on samples of grafted filtration membranes prepared in accordance with the procedure of Example 2 (samples 6A–6D), as well as on ungrafted controls (samples 6E and 6F). Each membrane was immersed in IgG solution containing ¹²⁵I goat IgG and 200 µg/ml unlabeled goat IgG for 60 minutes. Each membrane was washed with phosphate buffered saline (PBS) and evaluated for adsorbed IgG. The membranes were then washed with an aqueous solution of 1% SDS in 2M urea and evaluated again for adsorbed IgG. The results of these evaluations are set forth below.

| Sample | Substrate | Grafting Solution | Thickness (mil) [µm] | Post-PBS Adsorption (µg/cm²) | Post-SDS Adsorption (µg/cm²) |
|---|---|---|---|---|---|
| 6A | PVDF | 12% HEMA | 1.9 [48] | 25.9 | 19.5 |
| 6B | PVDF | 9% HEMA | 1.8 [46] | 28.8 | 23.9 |
| 6C | PVDF | 9% HEMA | 1.7 [43] | 22.4 | 19.6 |
| 6D | PVDF | 4% HPA | 1.7 [43] | 12.4 | 8.8 |
| 6E | PVDF | none | 1.6 [41] | — | 86.6 |
| 6F | PVDF | none | 1.5 [38] | — | 82.6 |

The resulting data demonstrates that a filtration membrane of the present invention which has been suitably graft polymerized will have a low protein adsorption level. The present inventive membranes grafted with hydroxyethylmethacrylate (HEMA) exhibited a much reduced level of protein adsorption as compared to the ungrafted controls. Moreover, the present inventive membrane grafted with hydroxypropylacrylate (HPA) adsorbed only about half as much protein as the HEMA-grafted membranes of the present invention.

EXAMPLE 7

This example illustrates that the microwave drying of the present inventive membrane has no significant adverse effect on the filtration characteristics of the membrane.

Two membrane samples were prepared in accordance with the procedure described in Example 1. One of the membranes was dried with a microwave dryer (designated 7A), while the other of the membranes was dried with a steam drum-dryer (designated 7B). The $K_{UF}$ values of the two membranes were determined both before and after drying, and the results are set forth below.

| Sample | $K_{UF}$ (as cast) (psi) [kPa] | $K_{UF}$ (dried) (psi) [kPa] |
| --- | --- | --- |
| 7A | 22 [152] | 21 [145] |
| 7B | 22 [152] | 17 [117] |

These results demonstrate that microwave drying of the membranes, in contrast to conventional drying, does not substantially affect the pore size of the present inventive membrane.

EXAMPLE 8

This example illustrates the isotropic nature, i.e., symmetrical pore structure, of the present inventive membrane.

Several membranes of differing $K_{UF}$ values were prepared in accordance with the procedure described in Example 1. The $K_{UF}$ and pressure drop ($\Delta P$) divided by thickness (in. Hg/mil and cm Hg/µm) for each membrane were determined, and the results are set forth below.

| Sample | $K_{UF}$ (psi) [kPa] | $\Delta P$/mil (in. Hg/mil) [cm Hg/µm] |
| --- | --- | --- |
| 8A | 12 [83] | 1.50 [0.15] |
| 8B | 12 [83] | 1.32 [0.13] |
| 8C | 13 [90] | 1.50 [0.15] |
| 8D | 16 [110] | 3.27 [0.33] |
| 8E | 17 [117] | 2.84 [0.28] |
| 8F | 17 [117] | 2.93 [0.29] |
| 8G | 17 [117] | 2.63 [0.26] |
| 8H | 17 [117] | 4.27 [0.43] |
| 8I | 18 [124] | 2.65 [0.27] |
| 8J | 18 [124] | 4.06 [0.41] |
| 8K | 19 [131] | 3.90 [0.39] |
| 8L | 21 [145] | 11.20 [1.12] |
| 8M | 21 [145] | 5.33 [0.53] |
| 8N | 22 [152] | 20.75 [2.08] |
| 8O | 22 [152] | 7.85 [0.79] |
| 8P | 23 [159] | 8.00 [0.80] |
| 8Q | 23 [159] | 14.40 [1.44] |
| 8R | 23 [159] | 11.00 [1.10] |
| 8S | 24 [165] | 12.08 [1.21] |
| 8T | 24 [165] | 14.96 [1.50] |
| 8U | 24 [165] | 14.07 [1.41] |
| 8V | 24 [165] | 11.93 [1.19] |
| 8W | 24 [165] | 14.52 [1.45] |
| 8X | 24 [165] | 9.70 [0.97] |
| 8Y | 25 [172] | 22.27 [2.23] |

The resulting data is plotted in the form of pressure drop across the membrane ($\Delta P$) divided by the thickness of the membrane (in. Hg/mil and cm Hg/µm) on a logarithmic scale versus membrane $K_{UF}$ (psi and kPa) as the graph of FIG. 4. The drawn curve is the result of a least squares fit and has a correlation factor of 0.87. As is apparent from the data, an increase in the $K_{UF}$ results in a logarithmic increase in the pressure drop as a function of thickness of the filtration membrane. This relationship is characteristic of an isotropic filtration membrane, and confirms that the present inventive filtration medium is isotropic in nature.

All of the references cited herein are hereby incorporated in their entireties by reference.

While this invention has been described with an emphasis upon preferred embodiments, it will be obvious to those of ordinary skill in the art that variations of the preferred products and methods may be used and that it is intended that the invention may be practiced otherwise than as specifically described herein. Accordingly, this invention includes all modifications encompassed within the spirit and scope of the invention as defined by the following claims.

What is claimed is:

1. An isotropic, skinless, porous polyvinylidene fluoride membrane comprising a surface coating of a polymer having the characteristics of rendering said membrane hydrophilic and less susceptible to the adsorption of proteins, wherein said membrane has the characteristic of achieving a titer reduction of at least about $10^8$ against $T_1$ bacteriophage.

2. The membrane of claim 1, wherein said membrane has a titer reduction of about $10^2$ or less against PP7 bacteriophage.

3. The membrane of claim 1, wherein said membrane has a titer reduction of at least about $10^8$ against PR772 coliphage.

4. The membrane of claim 3, wherein said membrane has a titer reduction of about $10^2$ or less against PP7 bacteriophage.

5. The membrane of claim 4, wherein said membrane has a thickness of about 20 mil or less.

6. The membrane of claim 5, wherein said membrane has a thickness of about 5 mil or less.

7. The membrane of claim 6, wherein said membrane has a thickness of about 3 mil to about 5 mil.

8. The membrane of claim 4, wherein said membrane has a $K_{UF}$ of at least about 15 psi when tested using liquid pairs having an interfacial tension of about 4 dynes/cm.

9. The membrane of claim 8, wherein said membrane has a $K_{UF}$ of about 15 psi to about 50 psi.

10. The membrane of claim 4, wherein said membrane has a $K_{UF}$ of at least about 17 psi.

11. The membrane of claim 10, wherein said membrane has a $K_{UF}$ of about 17 psi to about 40 psi.

12. The membrane of claim 11, wherein said membrane has a $K_{UF}$ of about 18 psi to about 30 psi.

13. The membrane of claim 3, wherein said membrane has a titer reduction of at least about $10^8$ against PP7 bacteriophage.

14. The membrane of claim 3, wherein said membrane has a thickness of about 20 mil or less.

15. The membrane of claim 14, wherein said membrane has a thickness of about 5 mil or less.

16. The membrane of claim 15, wherein said membrane has a thickness of about 3 mil to about 5 mil.

17. The membrane of claim 3, wherein said membrane has a $K_{UF}$ of at least about 15 psi when tested using liquid pairs having an interfacial tension of about 4 dynes/cm.

18. The membrane of claim 17, wherein said membrane has a $K_{UF}$ of about 15 psi to about 50 psi.

19. The membrane of claim 3, wherein said membrane has a $K_{UF}$ of at least about 17 psi.

20. The membrane of claim 19, wherein said membrane has a $K_{UF}$ of about 17 psi to about 40 psi.

21. The membrane of claim 20, wherein said membrane has a $K_{UF}$ of about 18 psi to about 30 psi.

22. The membrane of claim 1, wherein said membrane has a thickness of about 20 mil or less.

23. The membrane of claim 22, wherein said membrane has a thickness of about 5 mil or less.

24. The membrane of claim 23, wherein said membrane has a thickness of about 3 mil to about 5 mil.

25. The membrane of claim 22, wherein said polymer comprises one or more acrylic or methacrylic monomers having hydroxyl functional groups.

26. The membrane of claim 25, wherein said polymer comprises one or more monomers selected from the group consisting of hydroxyethylacrylate, hydroxyethylmethacrylate, hydroxypropylacrylate, and hydroxypropylmethacrylate.

27. The membrane of claim 26, wherein said polymer comprises hydroxyethylmethacrylate, hydroxypropylacrylate, or a combination thereof.

28. The membrane of claim 27, wherein said polymer further comprises polyethylene glycol 600 dimethacrylate.

29. The membrane of claim 27, wherein said polymer comprises hydroxypropylacrylate.

30. The membrane of claim 29, wherein said polymer further comprises polyethylene glycol 600 dimethacrylate.

31. The membrane of claim 25, wherein said polymer has been radiation grafted onto said membrane.

32. The membrane of claim 31, wherein said radiation is electron beam radiation.

33. A method of filtering a fluid comprising passing a fluid through the membrane of claim 22.

34. The method of claim 33, wherein said fluid comprises viruses in excess of $10^2$/ml before being passed through said membrane and less than $10^2$/ml after being passed through said membrane.

35. The method of claim 34, wherein said fluid comprises viruses in excess of $10^4$/ml before being passed through said membrane.

36. The method of claim 34, wherein said fluid comprises no viruses after being passed through said membrane.

37. The method of claim 33, wherein said fluid comprises viruses.

38. The method of claim 37, wherein said fluid comprises no viruses after being passed through said membrane.

39. A filter element comprising the membrane of claim 22 having sides which have been overlapped and sealed to form a tubular configuration having an exterior surface, an interior, and two ends, and end caps sealed to the ends of the tube, wherein at least one of said end caps has a central aperture providing access to the interior of the tube, and all of said seals are fluid-tight.

40. The filter element of claim 39, wherein said membrane is corrugated.

41. The filter element of claim 39, wherein at least one of the sides of said membrane is adhered to a porous support layer.

42. The filter element of claim 41, wherein said membrane and said porous support layer are corrugated.

43. The filter element of claim 42, wherein said filter element comprises multiple membranes adhered together.

44. The filter element of claim 43, wherein said membranes are separated by a porous support layer to which each membrane is adhered.

45. The membrane of claim 1, wherein said membrane has a $K_{UF}$ of at least about 15 psi when tested using liquid pairs having an interfacial tension of about 4 dynes/cm.

46. The membrane of claim 45, wherein said membrane has a $K_{UF}$ of about 15 psi to about 50 psi.

47. The membrane of claim 1, wherein said membrane has a $K_{UF}$ of at least about 17 psi.

48. The membrane of claim 47, wherein said membrane has a $K_{UF}$ of about 17 psi to about 40 psi.

49. The membrane of claim 48, wherein said membrane has a $K_{UF}$ of about 18 psi to about 30 psi.

50. The membrane of claim 1, wherein said polymer comprises one or more acrylic or methacrylic monomers having hydroxyl functional groups.

51. The membrane of claim 50, wherein said polymer comprises one or more monomers selected from the group consisting of hydroxyethylacrylate, hydroxyethylmethacrylate, hydroxypropylacrylate, and hydroxypropylmethacrylate.

52. The membrane of claim 51, wherein said polymer comprises hydroxyethylmethacrylate, hydroxypropylacrylate, or a combination thereof.

53. The membrane of claim 52, wherein said polymer further comprises polyethylene glycol 600 dimethacrylate.

54. The membrane of claim 52, wherein said polymer comprises hydroxypropylacrylate.

55. The membrane of claim 54, wherein said polymer further comprises polyethylene glycol 600 dimethacrylate.

56. The membrane of claim 50, wherein said polymer has been radiation grafted onto said membrane.

57. The membrane of claim 56, wherein said radiation is electron beam radiation.

58. A method of filtering a fluid comprising passing a fluid through the membrane of claim 1.

59. The method of claim 58, wherein said fluid comprises viruses in excess of $10^2$/ml before being passed through said membrane and less than $10^2$/ml after being passed through said membrane.

60. The method of claim 59, wherein said fluid comprises viruses in excess of $10^4$/ml before being passed through said membrane.

61. The method of claim 59, wherein said fluid comprises no viruses after being passed through said membrane.

62. The method of claim 58, wherein said fluid comprises viruses.

63. The method of claim 62, wherein said fluid comprises no viruses after being passed through said membrane.

64. A filter element comprising the membrane of claim 1 having sides which have been overlapped and sealed to form a tubular configuration having an exterior surface, an interior, and two ends, and end caps sealed to the ends of the tube, wherein at least one of said end caps has a central aperture providing access to the interior of the tube, and all of said seals are fluid-tight.

65. The filter element of claim 64, wherein said membrane is corrugated.

66. The filter element of claim 64, wherein at least one of the sides of said membrane is adhered to a porous support layer.

67. The filter element of claim 66, wherein said membrane and said porous support layer are corrugated.

68. The filter element of claim 67, wherein said filter element comprises multiple membranes adhered together.

69. The filter element of claim 68, wherein said membranes are separated by a porous support layer to which each membrane is adhered.

70. A method of preparing an isotropic, skinless, porous polyvinylidene fluoride membrane having (a) a $K_{UF}$ of at least about 15 psi when tested using liquid pairs having an interfacial tension of about 4 dynes/cm or (b) the characteristic of achieving a titer reduction of at least about $10^8$ against $T_1$ bacteriophage, which method comprises providing a casting solution comprising polyvinylidene fluoride and a solvent therefor, heating said casting solution to a uniform temperature of about 57° C. to about 60° C., spreading said casting solution onto a substrate to form a film, quenching said film in a quench bath so as to form a porous membrane, and washing and drying said porous membrane.

71. The method of claim 70, wherein said casting solution temperature is about 58° C. to about 60° C.

72. The method of claim 70, wherein said membrane is at least partially dried by exposing said membrane to microwave radiation.

73. The method of claim 70, wherein said membrane is treated to render said membrane hydrophilic and less susceptible to the adsorption of proteins.

74. The method of claim 73, wherein said treatment comprises bonding to the surface of said membrane a polymer comprising one or more acrylic or methacrylic monomers having hydroxyl functional groups.

75. The method of claim 74, wherein said polymer comprises one or more monomers selected from the group consisting of hydroxyethylacrylate, hydroxyethylmethacrylate, hydroxypropylacrylate, and hydroxypropylmethacrylate.

76. The method of claim 75, wherein said polymer comprises hydroxyethylmethacrylate, hydroxypropylacrylate, or a combination thereof.

77. The method of claim 76, wherein said polymer further comprises polyethylene glycol 600 dimethacrylate.

78. The method of claim 76, wherein said polymer comprises hydroxypropylacrylate.

79. The method of claim 78, wherein said polymer further comprises polyethylene glycol 600 dimethacrylate.

80. The method of claim 74, wherein said polymer is radiation grafted onto said membrane.

81. The method of claim 80, wherein said radiation is electron beam radiation.

82. A membrane prepared in accordance with the method of claim 70.

* * * * *